Feb. 13, 1934.   L. S. GREGORY   1,946,580
PROCESS OF REFRIGERATING AND SEPARATING GASEOUS PRODUCTS
Filed Sept. 4, 1931
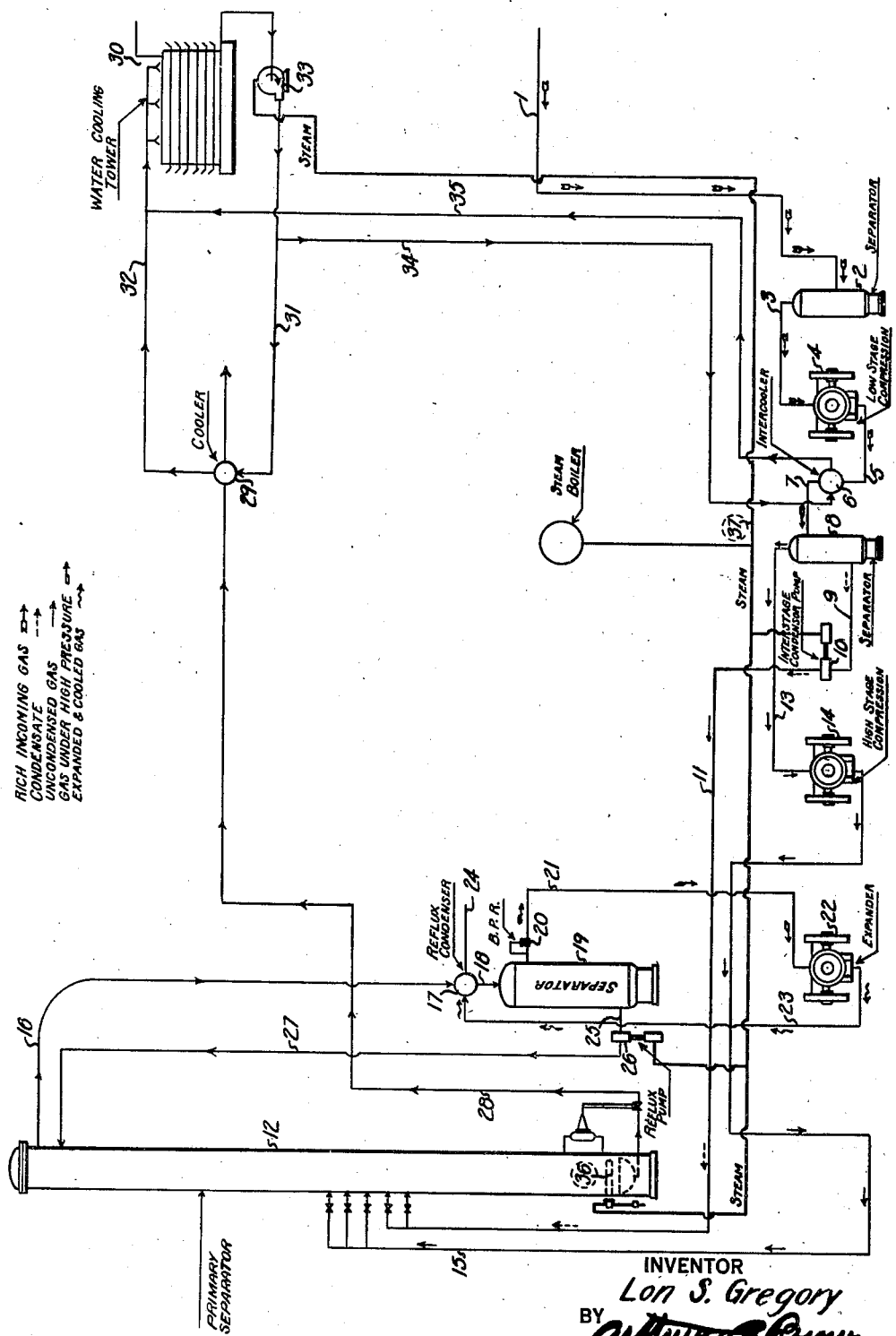
INVENTOR
*Lon S. Gregory*
BY
ATTORNEY Patented Feb. 13, 1934

1,946,580

UNITED STATES PATENT OFFICE 1,946,580

PROCESS OF REFRIGERATING AND SEPARATING GASEOUS PRODUCTS

Lon S. Gregory, Tulsa, Okla.

Application September 4, 1931. Serial No. 561,296

2 Claims. (Cl. 62—123)

My invention relates to a process of refrigerating and separating gaseous products, the principal object of the invention being to utilize the energy of highly compressed gases undergoing separation by expanding these gases to supply a portion, at least, of the power required for compressing the incoming gaseous feed, and to use the expanded and cooled gases as a cooling medium for the condensers of the apparatus.

In accomplishing this and other objects of my invention, I have provided an improved system and arrangement of apparatus, the preferred form of which is shown in the accompanying drawing, wherein the single figure illustrates a flow sheet of a system embodying my invention.

Referring more in detail to the drawing:

1 designates a feed supply line for conducting gaseous feed such as hydrocarbon vapors, impure carbon dioxide gas, etc. to the system, and is connected to a separator 2. A line 3, communicating with the upper end of the separator leads to a low stage compressor 4 from which the initially compressed gas is conducted by a pipe 5 to an intercooler 6. Leading from the intercooler is a line 7 connected to an intercooler separator 8 provided near its lower end with an outlet line 9 through which condensate is drawn by a pump 10 and forced through a conduit 11 into a primary separator 12 as a part of the feed.

Uncondensed gas remaining in the intercooler separator 8 passes from the upper end thereof through a pipe 13 connecting said separator with a high stage compressor 14, and is delivered in highly compressed form to the primary separator at a point slightly above the inflowing condensate through a line 15.

Leading from the primary separator adjacent its upper end is a conduit 16 connected with a reflux condenser 17 wherein the uncondensed gas from the primary separator is partially condensed in a manner presently described, and from which it is delivered through a pipe 18 into a reflux separator 19.

The uncondensed gas under high pressure is withdrawn from the reflux separator 19 through a back pressure regulator 20 interposed in a line 21 connected with the reflux separator adjacent its upper end and with an expander 22. While I have indicated an expander of the reciprocating type in the drawing it is obvious that other types of expanders may be used instead, as for example, a turbine type of expander.

From the expander the cooled expanded gas is conducted through a pipe 23 to the reflux condenser 17 to serve as a cooling medium for the uncondensed gases coming from the primary separator and, if found that this medium is insufficient to properly cool said gases, an external cooling medium may be used in addition thereto. After passing through the reflux condenser the gas, known as the light fraction, leaves the system through an outlet line 24 to be used for fuel or for other purposes.

The portion of gas condensing in the separator 19 is withdrawn from the lower end thereof through a pipe 25 by a pump 26 and is discharged as a reflux back into the upper portion of the primary separator through a conduit 27.

The heavy fraction of the feed is withdrawn from the base of the primary separator and is conducted through a line 28 to a cooler 29 and from there to storage. Cooling medium for the cooler 29 is preferably supplied by a cooling tower 30 connected in circuit with the cooler by a supply line 31 and discharge line 32, a pump 33 being interposed in the supply line.

Water from the cooling tower is also preferably used for cooling the intercooler 6 and is delivered thereto through a feed line 34 by the pump 33, and back to the cooling tower through a discharge line 35.

Steam may be used as a medium for supplying power to operate the pumps 10, 26, and 33, and also for heating the lower end of the primary separator as shown at 36, the steam conduits being indicated by the lines 37 of the drawing.

Assuming a system to be arranged and connected as described the operation thereof would be as follows:

Rich gas, such as hydrocarbon vapors, impure carbon dioxide gas, and the like, is fed into the system through the inlet line 1 and delivered to the first separator where it is freed of sediment and heavy or solid particles. The gas next passes through the low stage compressor into the intercooler and is discharged into the intercooler separator where a portion of the gas may be condensed. Any condensate which is formed in the intercooler separator may be pumped into the primary separator as a part of the feed while the uncondensed gas is drawn into the high stage compressor and conducted to the primary separator as the remainder of the feed. The uncondensed gas from the primary separator is delivered through the reflux condenser and into the reflux separator 19. While passing through the reflux condenser the gas is cooled by the uncondensed gas which is withdrawn from the separator 19 through the back pressure valve and passes through the expander. Power generated in the expander as a result of expansion of the gas may be used for any suitable purpose in the operation of the system, as for example to supply a portion of the power required for operating the compressors.

Condensate collecting in the separator 19 is delivered by the pump 26 back into the primary separator as reflux.

The expanded gas, after serving as a cooling medium for the reflux condenser, passes from the system as the light fraction and is used as fuel in case of a hydrocarbon feed, or wasted in case of an impure carbon dioxide feed or other impure gas feed. The heavy fraction is withdrawn from the base of the primary separator and, after being cooled in the cooler 29, is delivered to storage.

From the foregoing it will be apparent that I have so combined a system of refrigeration with a system of separation that the high pressure gas is utilized for supplying power to assist in operation of the plant by means of the expander, and the expanded gas is used as a cooling medium for the condensers. In this manner I have accomplished a saving of power and cooling medium required for operating the plant, and a consequent saving of cost in operating systems of this character.

What I claim and desire to secure by Letters Patent is:

1. The process of refrigerating and separating gaseous products including initially compressing the gas, separating liquid and gaseous products of said initial compression, compressing the gaseous product of said separation, uniting the liquid products of initial separation and secondary compression, rectifying said united products, condensing and separating light ends of said united products, returning condensate of said light ends as reflux to the united liquid products, expanding light ends of the last named separation, cooling the light ends of the united products with the product of said expansion, and drawing off condensate of the united products.

2. The process of refrigerating and separating gaseous products including initially compressing the gas, separating liquid and gaseous products of said initial compression, compressing the gaseous product of said separation, uniting the liquid products of initial separation and secondary compression, rectifying said united products, condensing and separating light ends of said united products, returning condensate of said light ends as reflux to the united liquid products, expanding light ends of the last named separation, converting the energy of said expansion to mechanical power, and drawing off condensate of the united products.

LON S. GREGORY.